United States Patent
Lin et al.

(10) Patent No.: US 12,462,105 B2
(45) Date of Patent: Nov. 4, 2025

(54) CLAUSE BASED SEMANTIC PARSING

(71) Applicant: Microsoft Technology Licensing, LLC, Redmond, WA (US)

(72) Inventors: Zeqi Lin, Redmond, WA (US); JianGuang Lou, Redmond, WA (US); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 392 days.

(21) Appl. No.: 17/926,999

(22) PCT Filed: May 27, 2021

(86) PCT No.: PCT/US2021/034655
§ 371 (c)(1),
(2) Date: Nov. 22, 2022

(87) PCT Pub. No.: WO2022/005657
PCT Pub. Date: Jan. 6, 2022

(65) Prior Publication Data
US 2023/0214597 A1    Jul. 6, 2023

(30) Foreign Application Priority Data
Jun. 29, 2020    (CN) .......................... 202010609575.9

(51) Int. Cl.
*G06F 40/30*      (2020.01)
*G06F 40/211*     (2020.01)
(Continued)

(52) U.S. Cl.
CPC ............ *G06F 40/30* (2020.01); *G06F 40/211* (2020.01); *G06F 40/289* (2020.01); *G06N 20/00* (2019.01)

(58) Field of Classification Search
CPC ..... G10L 15/04; G10L 15/16; G10L 15/1815; G10L 15/22; G10L 15/26; G06F 40/30;
(Continued)

(56) References Cited

U.S. PATENT DOCUMENTS 5,093,788 A    3/1992  Shiotani et al.
8,301,436 B2   10/2012 Wang
(Continued)

FOREIGN PATENT DOCUMENTS

CN    103250149 A    8/2013
CN    109670024 A    4/2019
(Continued)

OTHER PUBLICATIONS

Office Action Received for Chinese Application No. 202010609575. 9, mailed on May 24, 2024, 18 pages (English Translation Provided).
(Continued)

*Primary Examiner* — Abdelali Serrou
(74) *Attorney, Agent, or Firm* — Schwegman Lundberg & Woessner, P.A.

(57) ABSTRACT

According to implementations of the subject matter described herein, a clause-based semantic parsing solution is provided. In the solution, a first clause with independent semantics is determined from a target statement. The target statement is converted to a first intermediate statement based on a first logical representation corresponding to the first clause. Subsequently, at least one logical representation corresponding to at least part of semantics of the first intermediate statement is determined. The first logical representation and the at least one logical representation may be used to determine a target logical representation corresponding to semantics of the target statement. Therefore, more accurate semantic parsing can be achieved.

20 Claims, 5 Drawing Sheets

(51) Int. Cl.
  *G06F 40/289* (2020.01)
  *G06N 20/00* (2019.01)
(58) Field of Classification Search
  CPC ...... G06F 40/211; G06F 40/284; G06F 40/56;
    G06F 16/3329; G06F 40/205; G06F
    40/289; G06F 16/3344; G06F 40/253;
    G06F 16/367; G06F 40/35; G06F 18/24;
    G06F 40/247; G06F 16/243; G06F
    16/2433; G06F 16/24522; G06F
    16/24534; G06F 16/3346; G06F 16/36;
    G06F 16/90332; G06F 40/126; G06F
    16/3347; G06F 16/335; G06F 16/9535;
    G06F 18/2411; G06F 40/00; G06F
    40/263; G06F 40/268; G06F 40/295;
    G06F 16/35
  See application file for complete search history.

(56) References Cited

U.S. PATENT DOCUMENTS

| | | | |
|---|---|---|---|
| 8,731,905 | B1 | 5/2014 | Tsang et al. |
| 9,830,315 | B1* | 11/2017 | Xiao .................. G06F 40/30 |
| 2008/0320031 | A1* | 12/2008 | Denoual ............ G06F 16/8365 707/999.102 |
| 2015/0227528 | A1 | 8/2015 | Kang |
| 2015/0261744 | A1* | 9/2015 | Suenbuel ............ G06F 40/211 704/9 |
| 2015/0331850 | A1* | 11/2015 | Ramish ................. G06F 40/40 704/9 |
| 2017/0069315 | A1 | 3/2017 | Chung |
| 2018/0189269 | A1* | 7/2018 | Quirk .................. G06F 40/289 |
| 2018/0322188 | A1* | 11/2018 | Zhou .................... G06F 16/335 |
| 2019/0294676 | A1 | 9/2019 | Sapugay et al. |
| 2020/0073983 | A1 | 3/2020 | Sen |

FOREIGN PATENT DOCUMENTS

| | | |
|---|---|---|
| CN | 109753658 A | 5/2019 |
| CN | 109933772 A | 6/2019 |
| CN | 110427629 A | 11/2019 |
| CN | 110705316 A | 1/2020 |
| CN | 110727839 A | 1/2020 |
| EP | 0895396 A2 | 2/1999 |
| WO | 2020005601 A1 | 1/2020 |

OTHER PUBLICATIONS

Second Office Action Received for Chinese Application No. 202010609575.9, mailed on Oct. 31, 2024, 14 pages (English Translation Provided).

Third Office Action Received for Chinese Application No. 202010609575.9, mailed on Mar. 19, 2025, 15 pages (English Translation Provided).

Aho, et al., "Syntax directed translations and the pushdown assembler", In Journal of Computer and System Sciences, vol. 3, Issue 1, Feb. 1, 1969, pp. 37-56.

Berant, et al., "Imitation learning of agenda-based semantic parsers", In Transactions of the Association for Computational Linguistics, vol. 3, Oct. 2015, pp. 545-558.

Berant, et al., "Semantic parsing on Freebase from question-answer pairs", In Proceedings of the conference on empirical methods in natural language processing, Oct. 18, 2013, pp. 1533-1544.

Bojanowski, et al., "Enriching word vectors with subword information", In Journal of Computing Research Repository, Jul. 2016, pp. 135-146.

Bollacker, et al., "Freebase: a collaboratively created graph database for structuring human knowledge", In Proceedings of the ACM SIGMOD international conference on Management of data, Jun. 9, 2008, pp. 1247-1250.

Cheng, et al., "Learning Structured Natural Language Representations for Semantic Parsing", In Proceedings of the 55th Annual Meeting of the Association for Computational Linguistics, Jul. 30, 2017, pp. 44-55.

Cho, et al., "Learning phrase representations using RNN encoder-decoder for statistical machine translation", In Proceedings of the Conference on Empirical Methods in Natural Language Processing (EMNLP), Jun. 2014, pp. 1724-1734.

Devlin, et al., "BERT: Pre-training of Deep Bidirectional Transformers for Language Understanding", In Proceedings of the Conference of the North American Chapter of the Association for Computational Linguistics: Human Language Technologies, vol. 1 (Long and Short Papers), Jun. 2, 2019, pp. 4171-4186.

Dong, et al., "Coarse-to-Fine Decoding for Neural Semantic Parsing", In Proceedings of the 56th Annual Meeting of the Association for Computational Linguistics (Long Papers), Jul. 15, 2018, pp. 731-742.

Dong, et al., "Language to Logical Form with Neural Attention", In Proceedings of the 54th Annual Meeting of the Association for Computational Linguistics, Aug. 7, 2016, pp. 33-43.

Furuse, et al., "Splitting Long or Ill-formed Input for Robust Spoken-language Translation", In Proceedings of 17th International Conference on Computational Linguistics, vol. 1, Aug. 10, 1998, pp. 421-427.

Gu, et al., "Incorporating Copying Mechanism in Sequence-to-Sequence Learning", In Proceedings of the 54th Annual Meeting of the Association for Computational Linguistics, vol. 1, Aug. 7, 2016, pp. 1631-1640.

Guo, et al., "Towards Complex Text-to-SQL in Cross-Domain Database with Intermediate Representation", In Proceedings of the 57th Annual Meeting of the Association for Computational Linguistics, Jul. 28, 2019, pp. 4524-4535.

Jia, et al., "Data recombination for neural semantic parsing", In Proceedings of the 54th Annual Meeting of the Association for Computational Linguistics, Aug. 7, 2016, pp. 12-22.

Kalyanpur, et al., "Fact-based question decomposition in DeepQA", In IBM Journal of Research and Development, vol. 56, Issue 3, May 1, 2012, 11 Pages.

Kate, "Learning to Transform Natural to Formal Languages", In Proceedings of the Twentieth National Conference on Artificial Intelligence, Jul. 2005, pp. 1062-1068.

Krishnamurthy, et al., "Neural Semantic Parsing with Type Constraints for Semi-Structured Tables", In Proceedings of the Conference on Empirical Methods in Natural Language Processing, Sep. 7, 2017, pp. 1516-1526.

Liang, et al., "Learning Dependency-Based Compositional Semantics", In Journal of Computational Linguistics, vol. 39, Issue 2, May 2, 2013, pp. 389-446.

Ling, et al., "Latent predictor networks for code generation", In Proceedings of the 54th Annual Meeting of the Association for Computational Linguistics, Aug. 7, 2016, pp. 599-609.

Luong, et al., "Effective Approaches to Attention-Based Neural Machine Translation", In Proceedings of the Conference on Empirical Methods in Natural Language Processing, Sep. 17, 2015, pp. 1412-1421.

Manning, et al., "The Stanford CoreNLP Natural Language Processing Toolkit", In Proceedings of the 52nd Annual Meeting of the Association for Computational Linguistics, Jun. 22, 2014, pp. 55-60.

Min, et al., "Multi-hop Reading Comprehension through Question Decomposition and Rescoring", In Proceedings of the 57th Annual Meeting of the Association for Computational Linguistics, Jul. 28, 2019, pp. 6097-6109.

Pasupat, et al., "Compositional Semantic Parsing on Semi-Structured Tables", In Proceedings of the 53rd Annual Meeting of the Association for Computational Linguistics and the 7th International Joint Conference on Natural Language Processing, Jul. 26, 2015, pp. 1470-1480.

"International Search Report and Written Opinion Issued in PCT Application No. PCT/US21/034655", Mailed Date: Sep. 24, 2021, 9 Pages.

Pelletier, Francisj, "The Principle of Semantic Compositionality", In Journal of Topoi, vol. 13, Issue 1, Mar. 1994, 48 Pages.

(56) References Cited

OTHER PUBLICATIONS

Qi, et al., "Answering Complex Open-domain Questions Through Iterative Query Generation", In Proceedings of the Conference on Empirical Methods in Natural Language Processing, Nov. 3, 2019, pp. 2590-2602.

Rabinovich, et al., "Abstract Syntax Networks for Code Generation and Semantic Parsing", In Proceedings of the 55th Annual Meeting of the Association for Computational Linguistics, Jul. 30, 2017, pp. 1139-1149.

See, et al., "Get to the point: Summarization with pointer-generator networks", In Proceedings of the 55th Annual Meeting of the Association for Computational Linguistics (vol. 1: Long Papers), Jul. 30, 2017, pp. 1073-1083.

Shaw, et al., "Generating Logical Forms from Graph Representations of Text and Entities", In Proceedings of the 57th Annual Meeting of the Association for Computational Linguistics, Jul. 28, 2019, pp. 95-106.

Talmor, et al., "The Web as a Knowledge-Base for Answering Complex Questions", In Proceedings of the 2018 Conference of the North American Chapter of the Association for Computational Linguistics: Human Language Technologies, vol. 1 (Long Papers), Jun. 2018, pp. 641-651.

Treviso, et al., "Sentence Segmentation in Narrative Transcripts from Neuropsychological Tests using Recurrent Convolutional Neural Networks", In Proceedings of the 15th Conference of the European Chapter of the Association for Computational Linguistics, vol. 1, Apr. 3, 2017, pp. 315-325.

Vaswani, et al., "Attention Is All You Need", In Proceedings of 31st Conference on Neural Information Processing Systems, Dec. 4, 2017, 11 Pages.

Xiao, et al., "Sequence-based Structured Prediction for Semantic Parsing", In Proceedings of the 54th Annual Meeting of the Association for Computational Linguistics, vol. 1, Aug. 2016, pp. 1341-1350.

Yin, et al., "A Syntactic Neural Model for General-Purpose Code Generation", In Proceedings of the 55th Annual Meeting of the Association for Computational Linguistics (vol. 1: Long Papers), Jul. 30, 2017, pp. 440-450.

Zelle, et al., "Learning to parse database queries using inductive logic programming", In Proceedings of the thirteenth national conference on Artificial intelligence, vol. 2, Aug. 4, 1996, pp. 1050-1055.

Zettlemoyer, et al., "Learning to Map Sentences to Logical Form: Structured Classification with Probabilistic Categorial Grammars", In Proceedings of Twenty-First Conference on Uncertainty in Artificial Intelligence, Jul. 26, 2005, 9 Pages.

Zettlemoyer, et al., "Online Learning of Relaxed CCG Grammars for Parsing to Logical Form", In Proceedings of 13th Joint Conference on Empirical Methods in Natural Language Processing and Computational Natural Language Learning, Jun. 28, 2007, pp. 678-687.

Zhang, et al., "Complex Question Decomposition for Semantic Parsing", In Proceedings of the 57th Annual Meeting of the Association for Computational Linguistics, Jul. 2019, pp. 4477-4486.

Zhao, et al., "Type-Driven Incremental Semantic Parsing with Polymorphism", In the Conference of the North American Chapter of the Association for Computational Linguistics: Human Language Technologies, May 31, 2015, pp. 1416-1421.

Kate, et al., "Using String-Kernels for Learning Semantic Parsers", Proceedings of the 21st International Conference on Computational Linguistics and 44th Annual Meeting of the Association for Computational Linguistics, Jul. 2006, pp. 913-920.

Notice of Allowance Received for Chinese Application No. 202010609575.9, mailed on Jun. 13, 2025, 15 pages (English Translation Provided).

\* cited by examiner

CLAUSE BASED SEMANTIC PARSING

CROSS-REFERENCE TO RELATED APPLICATION

This application is a U.S. National Stage Filing under 35 U.S.C. 371 of International Patent Application Serial No. PCT/US2021/034655, filed May 27, 2021, and published as WO 2022/005657 A1 on Jan. 6, 2022, which application claims the benefit of priority to Chinese Patent Application No. 202010609575.9, filed Jun. 29, 2020, which applications and publication are incorporated herein by reference in their entirety.

BACKGROUND

In recent years, artificial intelligence technology has developed rapidly and is now being widely used in all aspects of people's lives. As a research focus of artificial intelligence technology, semantic parsing (also referred to as semantic recognition) of natural language is one of the basic technologies for many application scenarios of artificial intelligence. Semantic parsing technology interprets natural language as machine-understandable logical representations, thereby enabling a computer to perform corresponding subsequent operations. For example, intelligent voice assistants rely on semantic parsing technology to understand questions asked or instructions issued by users in natural language.

Besides traditional grammar-based semantic parsing, some solutions may implement semantic parsing using machine learning models. However, due to limitations of training corpus, currently it is hard to guarantee the accuracy of semantic parsing performed by machine learning models.

SUMMARY

According to implementations of the subject matter described herein, a clause-based semantic parsing solution is provided. In the solution, a first clause with independent semantics is determined from a target statement. The target statement is converted to a first intermediate statement based on a first logical representation corresponding to the first clause. Subsequently, at least one logical representation corresponding to at least part of semantics of the first intermediate statement is determined. The first logical representation and the at least one logical representation may be used to determine a target logical representation corresponding to semantics of the target statement. Therefore, more accurate semantic parsing can be achieved.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference signs refer to the same or similar elements.

DETAILED DESCRIPTION

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As discussed above, some solutions may implement semantic parsing using machine learning models. Due to limitations of training corpus, traditional machine learning models only can perform semantic parsing on input statements with a similar structure of the training corpus but have difficulty effectively parsing statements with a complicated structure.

According to implementations of the subject matter described herein, a solution for semantic parsing is proposed. In the solution, a first clause with independent semantics is determined from a target statement. Based on a first logical representation corresponding to semantics of the first clause, the target statement is converted to a first intermediate statement. Subsequently, at least one logical representation corresponding to at least part of semantics of the first intermediate statement is determined. The first logical representation and the at least one logical representation may be used to determine a target logical representation corresponding to semantics corresponding to the target statement. Therefore, drawbacks that traditional semantic parsing models limited training data and difficulty in handling statements with complicated structures may be overcome, and more accurate semantic parsing may be achieved.

Detailed description is presented below to various example implementations of the solution in conjunction with the drawings.

Figure 1:
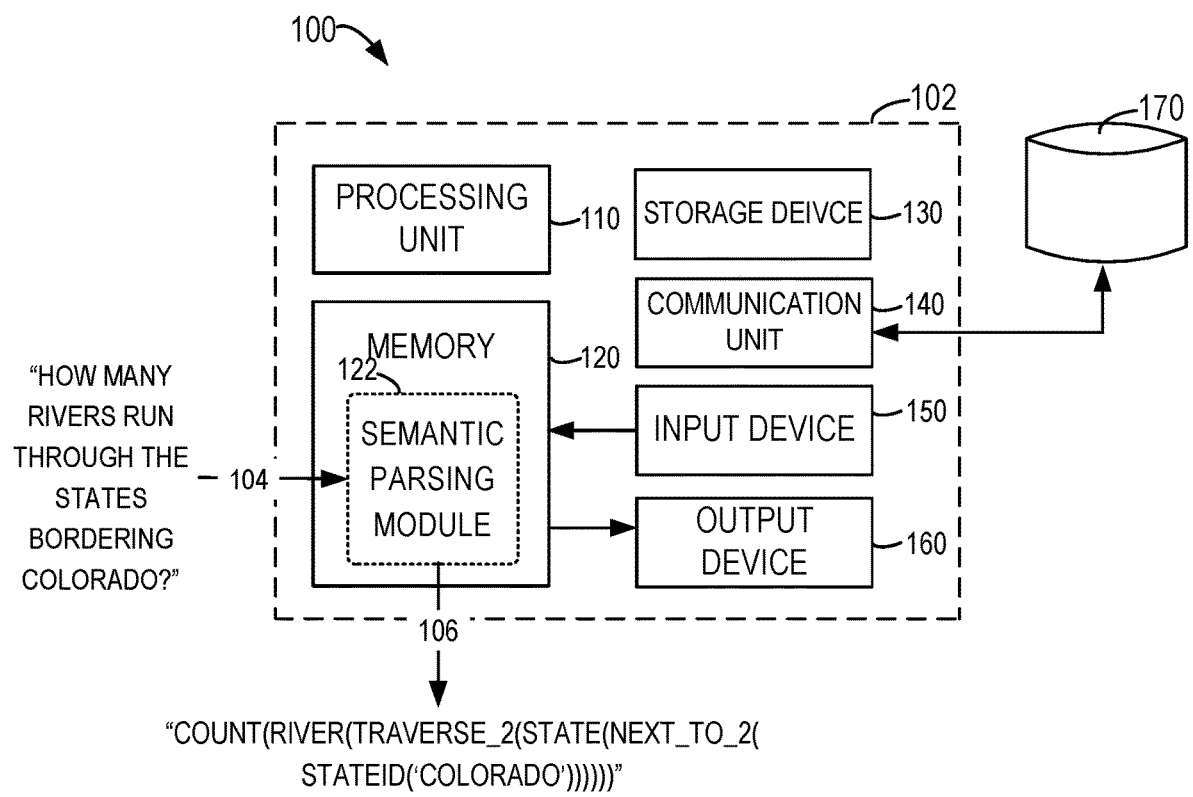
FIG. 1 illustrates a block diagram of a computing device which can implement a plurality of implementations of the subject matter described herein.

FIG. 1 illustrates a block diagram of a computing environment 100 that can implement a plurality of implementations of the subject matter described herein. It should be understood that the computing environment 100 shown in FIG. 1 is only exemplary and shall not constitute any limitation on the functions and scopes of the implementations described by the subject matter described herein. As shown in FIG. 1, the computing environment 100 includes a computing device 102 in the form of a general purpose computing device. Components of the computing device 102 may include, but is not limited to, one or more processors or processing units 110, a memory 120, a storage device 130, one or more communication units 140, one or more input devices 150, and one or more output devices 160.

In some implementations, the computing device 102 may be implemented as various user terminals or service terminals with computing capability. The service terminals may be servers, large-scale computing devices, and the like provided by a variety of service providers. The user terminal, for example, is a mobile terminal, a fixed terminal or a portable terminal of any type, including a mobile phone, a site, a unit, a device, a multimedia computer, a multimedia tablet, Internet nodes, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. It may also be predicted that the computing device 102 can support any type of user-specific interface (such as a "wearable" circuit, and the like).

The processing unit 110 may be a physical or virtual processor and may execute various processing based on the programs stored in the memory 120. In a multi-processor system, a plurality of processing units executes computer-executable instructions in parallel to enhance parallel processing capability of the computing device 102. The processing unit 110 can also be known as a central processing unit (CPU), microprocessor, controller and microcontroller.

The computing device 102 usually includes a plurality of computer storage mediums. Such mediums may be any attainable medium accessible by the computing device 102, including but not limited to, a volatile and non-volatile medium, a removable and non-removable medium. The memory 120 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash), or any combination thereof. The memory 120 may include a semantic parsing module 122, which is configured to perform various functions described herein. The semantic parsing module 122 may be accessed and operated by the processing unit 110 to realize corresponding functions. The storage device 130 may be a removable or non-removable medium, and may include a machine-readable medium (e.g., a memory, a flash drive, a magnetic disk) or any other medium, which may be used for storing information and/or data and be accessed within the computing device 102.

Functions of components of the computing device 102 may be realized by a single computing cluster or a plurality of computing machines, and these computing machines may communicate through communication connections. Therefore, the computing device 102 may operate in a networked environment using a logic connection to one or more other servers, a Personal Computer (PC) or a further general network node. The computing device 102 may also communicate through the communication unit 140 with one or more external devices (not shown) as required, where the external device, e.g., a data base 170, a further storage device, a server, a display device, and so on, communicates with one or more devices that enable users to interact with the computing device 102, or with any device (such as a network card, a modem, and the like) that enable the computing device 102 to communicate with one or more other computing devices. Such communication may be executed via an Input/Output (I/O) interface (not shown).

The input device 150 may be one or more various input devices, such as a mouse, a keyboard, a trackball, a voice-input device, and the like. The output device 160 may be one or more output devices, e.g., a display, a loudspeaker, a printer, and so on.

The computing device 102 may be used for clause-based semantic parsing. In order to perform semantic parsing, the computing device 102 may obtain a target statement 104. In some implementations, the computing device 102 may receive the target statement 104 through the input device 150. Depending on a specific scenario, different types of input devices 150 may be used to receive the target statement 104.

Alternatively, the target statement 104 may be input by a user via a device other than the computing device 102. Subsequently, the target statement 104 may be sent to the communication unit 140 of the computing device 102 over a wired or wireless network.

Alternatively, the target statement 104 may also be data stored in the storage device 130 within the computing device 102. As an example, the target statement 104 may be output by another module running on the computing device 102. For example, the target statement 104 may be a result of voice recognition of voice data input by the user, wherein the voice recognition may be performed by a voice recognition module running on the computing device 102.

In the example of FIG. 1, the target statement 104 is a statement "How many rivers run through the states bordering Colorado?" written in English. It should be understood that the target statement 104 may be written in any language, and the subject matter described herein is not intended to be limited in this regard.

The target statement 104 is used as an input of the semantic parsing module 122. The processing unit 110 of the computing device 102 can run the semantic parsing module 122 to generate a target logical representation 106 "count (river(traverse_2(state(next_to_2(stateid('colorado'))))))" corresponding to semantics of the target statement 104.

It should be understood that the target logical representation 106 may be represented in a computer-understandable language (other than natural language), and the above specific example of the target logical representation 106 is merely illustrative. As required, the target logical representation 106 may further be provided in any appropriate form, such as functional query language, PROLOG query language, SQL query language, SPARQL query language or Lambda-DCS query language. The subject matter described herein is not intended to limit a specific form of the target logical representation 106.

In some implementations, the semantic parsing module 122 may provide the target logical representation 106 as an input into other modules running on the computing device 102 so as to cause the computing device 102 to perform an additional act. For example, based on the target logical representation 106, another functional module running on the computing device 102 may obtain an answer corresponding to the target logical representation 106 and provide the answer to the output device 160. Then the output device 160 may provide the answer to the user in any appropriate form.

Alternatively, the semantic parsing module 122 may further send the target logical representation 106 to a device other than the computing device 102 over a wired or wireless network, so as to cause the device to perform an additional act. For example, when the target statement 104 is a command statement associated with a control device, the target logical representation 106 may cause the device to perform an act corresponding to the command statement.

Example implementations of clause-based semantic parsing in the semantic parsing module 122 will be discussed in detail below.

Example Process

Figure 2:
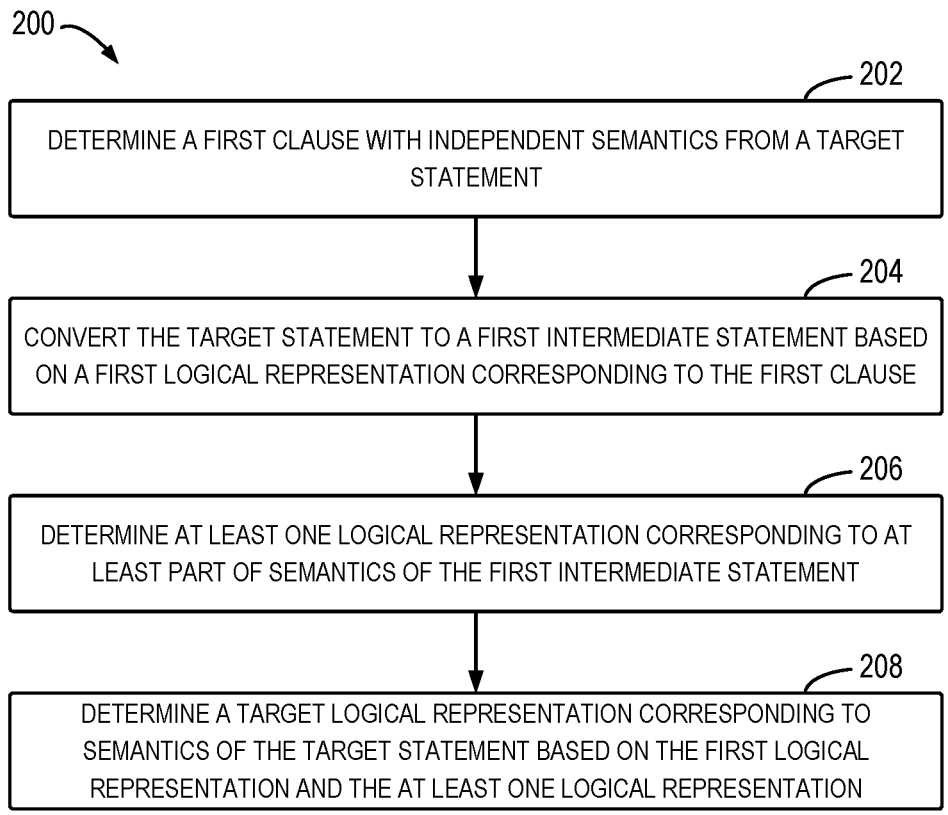
FIG. 2 illustrates a flowchart of a process of semantic parsing according to some implementations of the subject matter described herein.

FIG. 2 shows a flowchart of a semantic parsing process 200 according to some implementations of the subject matter described herein. The process 200 may be implemented by the computing device 102, e.g., implemented in the semantic parsing module 122 of the computing device 102.

As shown in FIG. 2, at 202, the computing device 102 determines a first clause with independent semantics from the target statement 104. The target statement 104 herein refers to a statement represented in a natural language. As discussed above, the target statement 104 may be input by a user or generated by another module. It should be understood that the computing device 102 may obtain the to-be-parsed target statement 104 through any appropriate solutions, and the subject matter described herein is not intended to be limited in this regard.

Figure 3:
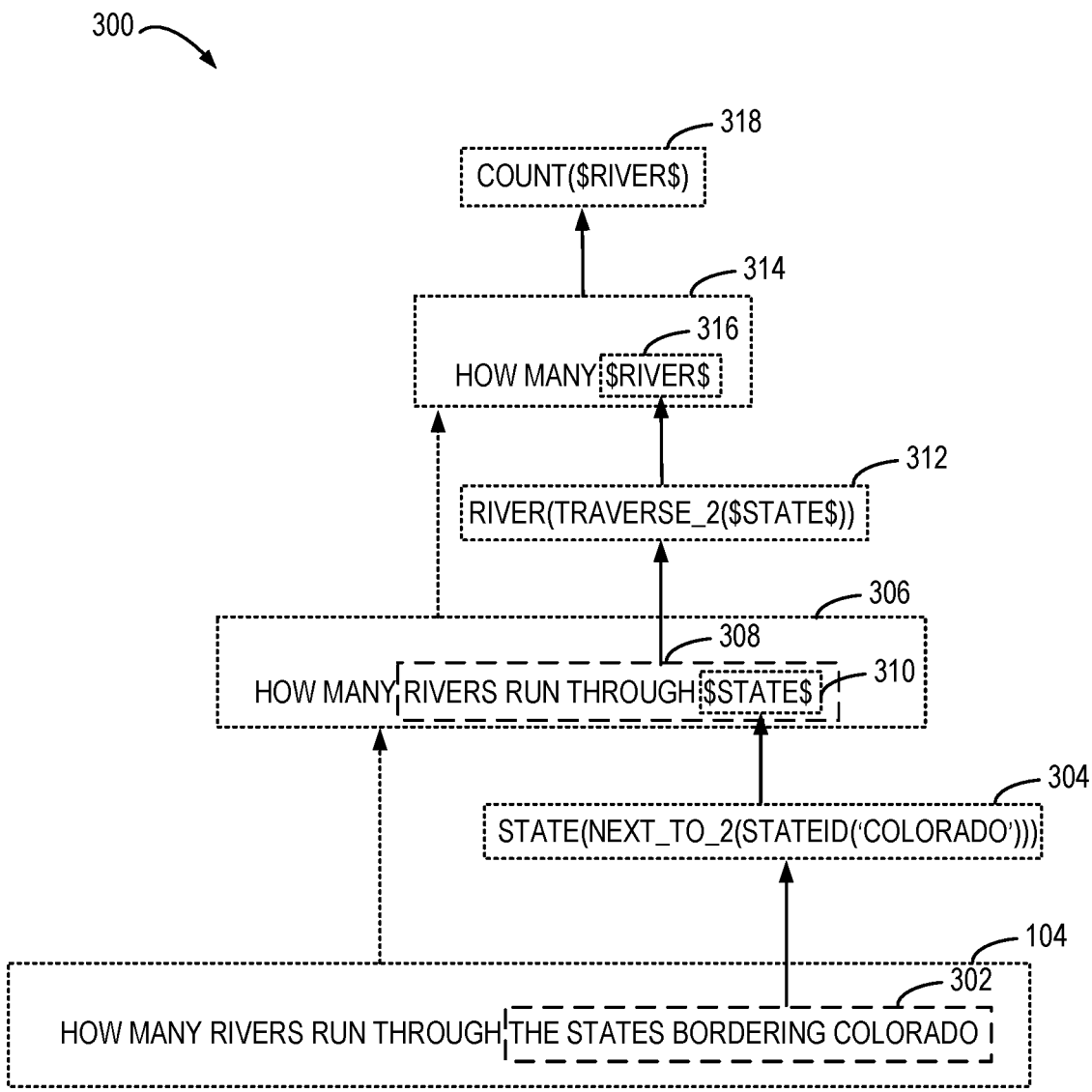
FIG. 3 illustrates a schematic view of clause-based semantic parsing according to some implementations of the subject matter described herein.

The process discussed in FIG. 2 will be described in conjunction with an example of FIG. 3. FIG. 3 shows a schematic view 300 of clause-based semantic parsing according to some implementations of the subject matter described herein. As depicted, the computing device 102 may determine, from the target statement 104, a first clause 302 "the states bordering Colorado" with independent semantics.

In some implementations, the computing device 102 may use a machine learning module to determine the first clause 302 from the target statement 104. For example, the computing device 102 may input the target statement 104 into a clause recognition module to obtain start and end positions of the first clause 302 with independent semantics in the target statement 104.

Regarding the example of FIG. 3, the clause recognition module may, for example, output that the start position of the first clause 302 is the word order (e.g., 6) of the word "the" in the target statement 104 and that the end position of the first clause 302 is the order (e.g., 9) of the word "Colorado" in the target statement 104. Alternatively, the start position may also be the character order of the start letter "t" of the word "the" in the target statement, and the end position may be the character order of the end letter "o" of the word "Colorado" in the target statement.

It should be understood that the start position and the end position are only for uniquely identifying the first clause 302 from the target statement 104. Any appropriate position information may be used to indicate the start and end positions or to identify the position of the first clause 302 in the target statement 104, and the subject matter described herein is not intended to be limited in this regard.

In some implementations, the clause recognition module may be trained based on a plurality of training statements and position information of an independent clause with independent semantics in each training statement. Like the output of the clause recognition module, the position information may indicate start position and end position of the independent clause in the training statement. A target function $J_{Seg}(\phi)$ of the clause recognition module may be formulated as:

$$J_{Seg}(\phi) = \sum_{(x,s)\in\mathcal{A}} \log p(s|x) \quad (1)$$

wherein $\phi$ denotes a parameter of the clause recognition model, A denotes a training dataset, s denotes an independent clause, x denotes a training statement, and $p(s|x)$ denotes a conditional probability of determining s from x.

In some implementations, the position information of the independent clause may be manually labeled. Alternatively, the position information may also be generated according to basic training data for training a logical representation parsing model. The basic training data only comprises a raw statement and a corresponding logical representation but fails to include the position information of the independent clause. A process of determining the position information based on the basic training data will be described in detail later in conjunction with a training process of the model.

At 204, the computing device 102 converts the target statement to a first intermediate state based on a first logical representation corresponding to semantics of the first clause. Specifically, the computing device 102 may first determine the first logical representation corresponding to semantics of the first clause.

In some implementations, the computing device 102 may also use a machine learning model to determine the first logical representation. It should be understood that the computing device 102 may use any appropriate logical representation parsing models to generate the first logical representation.

As an example, a Seq2Seq semantic parsing model proposed by Dong and Lapata in 2016 may be used to generate the first logical representation, and the model comprises an encoder and a decoder. It should be understood that an existing appropriate training set may be used to train the model, so that the model can generate a logical representation corresponding to semantics of a statement.

In the example of FIG. 3, the first clause 104 is converted to a corresponding first logical representation 304 "state (next_to_2(stateid('colorado')))."

Subsequently, the computing device 102 may further determine a simplified representation corresponding to the first logical representation. As an example, a syntax-directed translation algorithm proposed by Aho and Ullman in 1969 may be used to determine the simplified representation of the first logical representation. In the example of FIG. 3, according to the translation algorithm, the first clause 302 "the states bordering Colorado" may be represented as a simplified representation 310 "$state$." It should be understood that any other appropriate simplified representation determining methods may also be used, and the subject matter described herein is not intended to be limited in this regard.

Further, the computing device 102 may use the simplified representation of the first logical representation to replace the first clause in the target statement so as to obtain an intermediate statement. In the example of FIG. 3, after replacing the first clause 302 in the target statement 104 with the simplified representation 310, an intermediate statement "How many rivers run through $state$" may be obtained.

At 206, the computing device 102 determines at least one logical representation corresponding to at least part of semantics of the first intermediate statement.

A detailed process of 206 will be described in conjunction with FIG. 4. This figure shows a flowchart of a process 400 of determining the at least one logical representation according to some implementations of the subject matter described herein.

Figure 4:
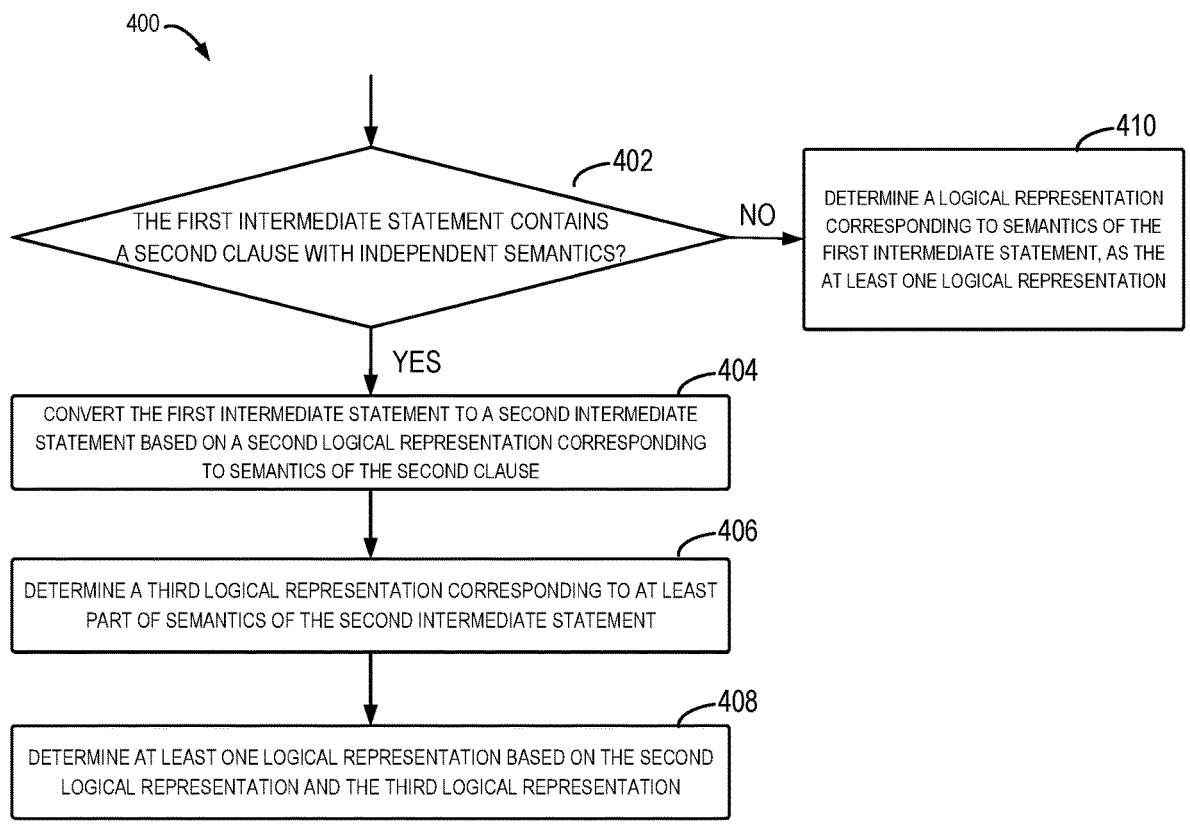
FIG. 4 illustrates a flowchart of a process of determining at least one logical representation according to some implementations of the subject matter described herein.

As shown in FIG. 4, at 402, the computing device 102 may determine whether the first intermediate statement contains a second clause with independent semantics. Still with reference to the example of FIG. 3, the computing device 102 may use the clause recognition model to continue processing the first intermediate statement 306, so as to determine whether the first intermediate statement 306 contains a second clause with independent semantics.

In response to determining at 402 that the first intermediate statement fails to contain a second clause with independent semantics, the process 400 proceeds to block 410. At 410, the computing device 102 may determine a logical representation corresponding to semantics of the first intermediate statement, as the at least one logical representation. Specifically, the computing device 102 may use the above logical representation parsing model to generate the logical representation corresponding to semantics of the first intermediate statement.

On the contrary, if it is determined at 402 that the first intermediate statement comprises the second clause with independent semantics, then the process 400 proceeds to block 404. At block 404, the computing device 102 may convert the first intermediate statement to a second intermediate statement based on a second logical representation corresponding to semantics of the second clause.

In the example of FIG. 3, the computing device 102 may use the clause recognition model to determine that the first intermediate statement 306 further contains the second clause 308 "rivers run through $state$" with independent semantics.

Like the step discussed with reference to 204, the computing device 102 may determine the second logical representation 312 "river(traverse_2($state$))" corresponding to semantics of the second clause 308. The computing device 102 may then determine a simplified representation 316 "$river$" of the second logical representation 312. Next, the computing device 102 may replace the second clause 308 with the simplified representation 316 in the first intermediate statement 306, so as to obtain the second intermediate statement 314.

At 406, the computing device 102 may determine a third logical representation corresponding to at least part of semantics of the second intermediate statement.

Specifically, the computing device 102 may generate the third logical representation corresponding to at least part of semantics of the second intermediate statement with reference to steps at 402, 404 and 410. That is, the computing device 102 may iteratively determine whether the generated second intermediate statement contains a further clause with independent semantics. If a clause with independent semantics is included, then the computing device 102 may iteratively perform steps 402 to 406 so as to parse a logical representation corresponding to the clause with independent semantics one by one. On the contrary, if, through several iterations of parsing, the generated intermediate statement does not contain a clause with independent semantics, then the computing device 102 may generate a logical representation corresponding to all semantics of the intermediate statement and terminate the iteration.

Continuing the example of FIG. 3, the computing device 102 may use a clause generating model to determine that the second intermediate statement 314 does not contain a clause with independent semantics. Accordingly, the computing device 102 may generate the third logical representation 318 "count($river$)" corresponding to all semantics of the second intermediate statement 314 and terminate the iterative parsing.

At 408, the computing device 102 may determine the at least one logical representation based on the second logical representation and the third logical representation. Specifically, the computing device 102 may use the second logical representation and the at least one third logical representation, resulting from the iterative parsing, as the at least one logical representation corresponding to at least part of semantics of the first intermediate statement.

Take FIG. 3 as an example. The computing device 102 may determine that the at least one logical representation corresponding to at least part of semantics of the first intermediate statement 306 comprises the second logical representation 312 and the third logical representation 318.

At 208, the computing device 102 determines a target logical representation corresponding to semantics of the target statement based on the first logical representation and the at least one logical representation. Specifically, the computing device 102 may determine the target logical representation by combining the first logical representation and the at least one logical representation.

As an example, where a simplified representation is used to replace a corresponding logical representation, the computing device 102 may replace the simplified representation with the logical representation one by one, so as to obtain a logical representation corresponding to semantics of the target statement.

For the example of FIG. 3, the computing device 102 may generate the target logical representation by using the first logical representation 304, the second logical representation 312 and the third logical representation 318. Specifically, the computing device 102 may use the first logical representation 304 to replace the simplified representation 310 in the second logical representation 312, so as to obtain a logical representation "river(traverse_2(state(next_to_2(stateid ('colorado')))." Subsequently, the computing device 102 may use this logical representation to replace the simplified representation 316 corresponding to the second logical representation 312 in the third logical representation 318, so as to obtain a target logical representation "countriver(river (traverse_2(state(next_to_2(stateid('colorado'))))))".

As discussed above, the implementations of the subject matter described herein may iteratively parse logical representations of clauses included in a target statement, so as to convert the complicated target statement to a combination of logical representations of a plurality of simple clauses. Since training corpora of current semantic parsing models are usually limited, these semantic parsing models can hardly handle statements with complicated syntactic structure. With the clause-based semantic parsing method of the subject matter described herein, the implementations of the subject matter described herein may effectively handle statements with complicated structures without relying on extra training corpora, thereby improving the accuracy of semantic parsing.

Training of Models

As discussed above, the subject matter described herein may use the clause recognition model to identify a clause with independent semantics from a target statement and use the logical representation parsing model to determine a logical representation corresponding to semantics of the clause. A detailed discussion is presented below to a training process of the clause recognition model and the logical representation parsing model.

In some implementations, the clause recognition model and the logical parsing model may be independently trained. It should be understood that a corpus for training the logical parsing model can be easily obtained, and the logical parsing model may be trained using any existing appropriate training corpus. On the contrary, currently there is not yet a public training corpus used for the clause recognition model.

On the one hand, as discussed above, a training corpus for training the clause recognition model may be generated using manual standards. However, such an approach requires huge manpower inputs, and the data amount of the obtained training corpus is usually limited. This will greatly affect the accuracy of models.

Figure 5:
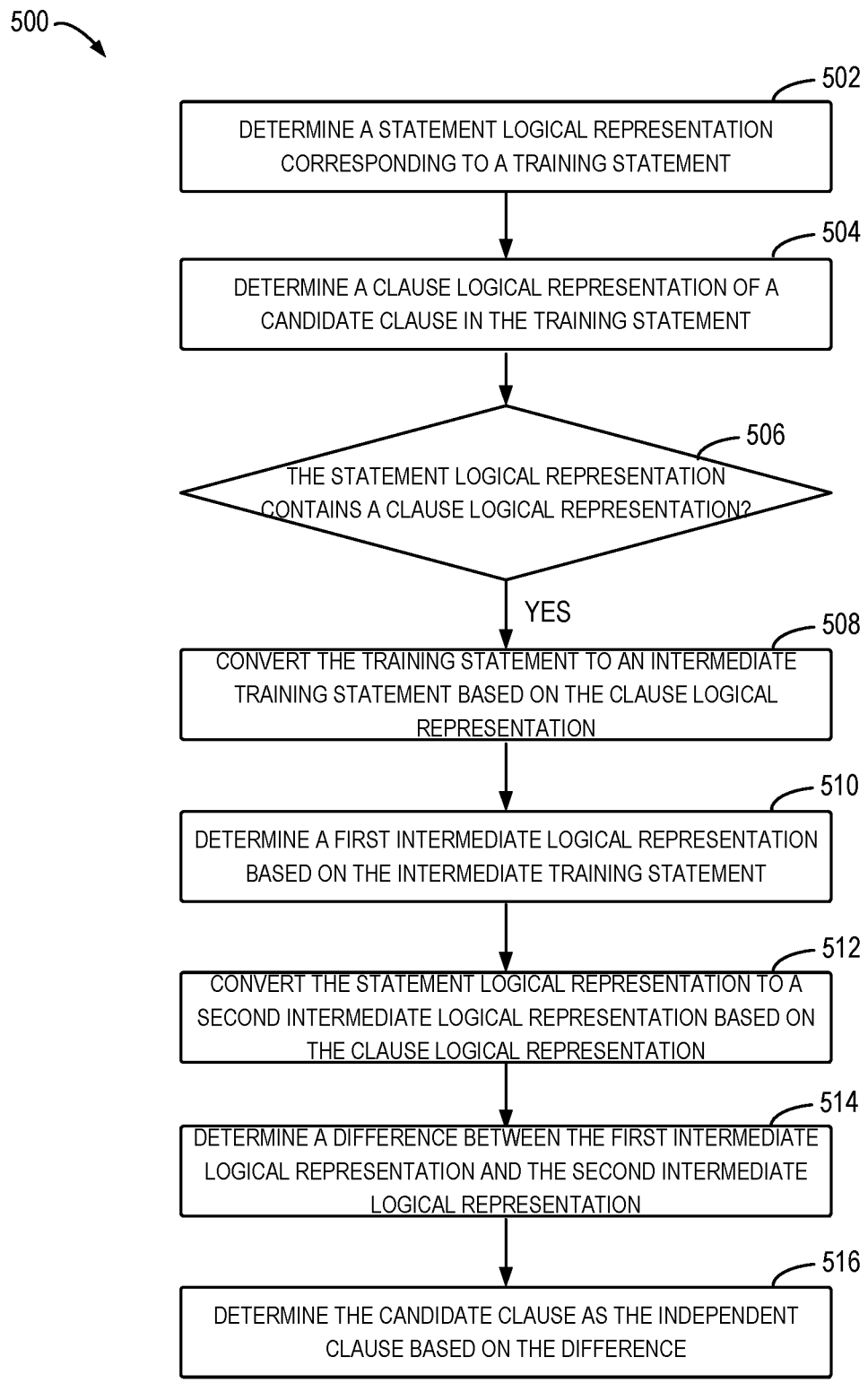
FIG. 5 illustrates a flowchart of a process of generating a training corpus of a clause recognition model according to some implementations of the subject matter described herein.

According to some implementations of the subject matter described herein, the training corpus for training the clause recognition model may be generated using the existing corpus for training the logical parsing model. With reference to FIG. 5, a description is presented below of a flowchart of a process 500 for generating a training corpus for a clause recognition model according to some implementations of the subject matter described herein.

In some implementations, the process 500 may be implemented by the computing device 102. It should be understood that the process 500 for generating a training corpus may also be implemented by a device other than the computing device 102. For the sake of description, the process 500 will be described in conjunction with the computing device 102.

As shown in FIG. 5, at 502, the computing device 102 may determine a statement logical representation corresponding to a training statement. For example, an existing training dataset for training the logical representation parsing model may be represented as D, which comprises a plurality of training instances (x, y), wherein x denotes a training statement, and y denotes a corresponding statement logical representation. The computing device 102 may obtain the training statement x and the corresponding statement logical representation y from the training dataset D.

At 504, the computing device 102 may determine a clause logical representation of a candidate clause in the training statement. Specifically, the computing device 102 may, for example, traverse a start position and an end position of the training statement so as to determine a corresponding candidate clause. Subsequently, the computing device 102 may, for example, use the existing well-trained logical representation parsing model to determine the clause logical representation of the candidate clause.

At 506, the computing device 102 may determine whether the statement logical representation contains the clause logical representation or not. In some implementations, for simplicity, if it is determined at 506 that the statement logical representation contains the clause logical representation, the computing device 102 may directly determine the candidate clause as an independent clause.

Alternatively, since the training statement might comprise a plurality of candidate clauses whose clause logical representations are included in the statement logical representation, the computing device 102 may perform an additional step of determining whether the candidate clause may be used as the independent clause with independent semantics or not.

Specifically, if it is determined at 506 that the statement logical representation contains the clause logical representation, then the process 500 may proceed to 508. At 508, the computing device 102 may convert the training statement to an intermediate training statement based on the clause logical representation.

It should be understood that reference may be made to the process at 204 to convert the training statement to the intermediate training statement. Specifically, the computing device 102 may first determine a simplified representation of the clause logical representation and replace the candidate clause in the training statement with the simplified representation so as to obtain the intermediate training statement.

At 510, the computing device 102 may determine a first intermediate logical representation of the intermediate training statement. Specifically, the computing device 102 may use the existing well-trained logical representation parsing model to determine a first intermediate logical representation of the intermediate training statement. For example, the first intermediate logical representation may be formulated as:

$$z_0([s \mapsto d(z_0(s))]x) \quad (2)$$

wherein $z_0$ denotes the existing well-known logical representation parsing model, $z_0(\ )$ denotes using the parsing model to process a statement within parentheses, s denotes a candidate clause, $d(z_0(s))$ denotes a simplified representation of a clause logical representation of the candidate clause, x denotes a training statement, and $([s \mapsto d(z_0(s))]x)$ denotes replacing x in s with $d(z_0(s))$.

At 512, the computing device 102 may convert the statement logical representation to a second intermediate logical representation based on the clause logical representation. Specifically, the computing device 102 may replace the clause logical representation in the statement logical representation with the simplified representation of the clause logical representation, thereby obtaining the second intermediate logical representation. For example, the second intermediate logical representation may be formulated as:

$$[z_0(s) \mapsto d(z_0(s))]_y \quad (3)$$

wherein y denotes a statement logical representation, and $[z_0(s) \mapsto d(z_0(s))]_y$ denotes replacing $z_0(s)$ in y with $d(z_0(s))$.

At 514, the computing device 102 may determine a difference between the first intermediate logical representation and the second intermediate logical representation. For example, the computing device 102 may determine an edit distance between the first intermediate logical representation and the second intermediate logical representation as the difference.

At 516, the computing device 102 may determine the candidate clause as the independent clause based on the difference. In some implementations, when it is determined that the difference is less than a threshold, the computing device 102 may determine the candidate clause as the clause with independent semantics. Alternatively, the computing device 102 may select a predetermined number of candidate clauses with minimal difference determined from the training statement, as clauses with independent semantics.

Based on the above method, the implementations of the subject matter described herein may generate the training corpus for training the clause recognition model by using the existing training corpus for training the logical representation parsing model. Through the automated corpus generating process, the cost of manual annotations may be greatly reduced, and the accuracy of the clause recognition model may be improved.

It can be seen that the logical representation parsing model is also used in the process of creating the training corpus for training the clause recognition model. It should be understood that the logical representation parsing model may be a model that is same as or different from the logical representation parsing model for generating a logical representation of a clause in the process with reference to FIG. 2.

In some implementations, the logical representation parsing model for generating a logical representation of a clause may be based on the logical representation parsing model (referred to as an initial logical representation parsing model for the sake of distinction) for creating a training corpus. It should be understood that the initial logical representation parsing model may be well trained based on an existing training dataset.

Nevertheless, since the existing training dataset usually fails to include an intermediate statement obtained by replacing a clause with a simplified representation, such an initial logical representation parsing model might not achieve good effect when processing an intermediate statement.

Further, after obtaining the clause recognition model, the computing device 102 may, for example, convert the initial training dataset D to a new training dataset D', which comprises a plurality of training instances (x', y'), wherein x' and y' may be formulated as:

$$x'=[s \mapsto d(z_0(s))]x \quad (4)$$

$$y'=[z_0(s) \mapsto d(z_0(s))]y \quad (5)$$

For definitions of respective elements in Formulas (4) and (5), reference may be made to explanations of Formulas (2) and (3), which are not detailed here.

The computing device 102 may use the new training dataset D' to train the initial logical representation parsing model, so that the trained logical representation parsing model can well parse intermediate statements comprising simplified representations.

The method of independently training the clause recognition model and the logical representation parsing model has been introduced above. In some implementations, the clause recognition model and the logical representation parsing model may also be jointly trained based on a same training dataset.

As an example, a reparameterization method may be used to jointly train the clause recognition model and the logical representation parsing model. For example, a Gumble-Softmax method may be used to approximate a discrete hidden variable of a clause with independent semantics, so that the clause recognition model and the logical representation parsing model are jointly trained.

Alternatively, a policy gradient method may further be used to jointly train the clause recognition model and the logical representation parsing model. Specifically, Monte Carlo sampling may be used to sample an output of the clause recognition model so as to obtain a corresponding clause. Subsequently, a statement may be replaced using the above method for replacing a clause with a simplified representation of a logical representation, so as to obtain the clause and the replaced statement. Then, the clause and the replaced statement are separately processed using the logical representation parsing model, so as to obtain two corresponding logical representations. During training, an objective is to make a combination of the two logical representations close to a logical representation truth value corresponding to the training statement.

It should be understood that the above joint training approach is merely illustrative, and other appropriate joint training approaches may further be designed according to needs.

Example Implementations

Some example implementations of the subject matter described herein are listed below.

In a first aspect, the subject matter described herein provides a computer-implemented method, which comprises: determining a first clause with independent semantics from a target statement; converting the target statement to a first intermediate statement based on a first logical representation corresponding to the first clause; determining at least one logical representation corresponding to at least part of semantics of the first intermediate statement; and determining a target logical representation corresponding to semantics of the target statement based on the first logical representation and the at least one logical representation.

In some implementations, determining the at least one logical representation comprises: if it is determined that the first intermediate statement comprises a second clause with independent semantics, converting the first intermediate statement to a second intermediate statement based on a second logical representation corresponding to semantics of the second clause; and determining a third logical representation corresponding to at least part of semantics of the second intermediate statement; and determining the at least one logical representation based on at least the second logical representation and the third logical representation.

In some implementations, determining the first clause comprises: identifying a first clause from the target statement using a clause recognition model, wherein the clause recognition model is trained based on a plurality of training statements and position information of an independent clause with independent semantics in each training statement.

In some implementations, the position information indicates a start position and an end position of the independent clause in the training statement.

In some implementations, the method further comprises: determining a statement logical representation corresponding to the training statement; determining a clause logical representation of a candidate clause in the training statement; and if it is determined that the statement logical representation comprises the clause logical representation, determining the candidate clause as the independent clause.

In some implementations, the method further comprises: determining a statement logical representation corresponding to the training statement; determining a clause logical representation of a candidate clause in the training statement; and if it is determined that the statement logical representation contains the clause logical representation, converting the training statement to an intermediate training statement based on the clause logical representation; determining a first intermediate logical representation of the intermediate training statement; converting the statement logical representation to a second intermediate logical representation based on the clause logical representation; and determining the candidate clause as the independent clause based on a difference between the first intermediate logical representation and the second intermediate logical representation.

In some implementations, the first logical representation is determined using a logical representation parsing model, and the clause recognition model and the logical representation parsing model are jointly trained based on a same training dataset.

In some implementations, converting the target statement to an intermediate statement comprises: replacing a first clause in the target statement with a simplified representation of the first logical representation, so as to obtain the intermediate statement.

In some implementations, determining a target logical representation of the target statement comprises: combining the first logical representation and the at least one logical representation so as to determine the target logical representation.

In a second aspect, a device is provided. The device comprises: a processing unit; and a memory, coupled to the processing unit and having instructions stored thereon, the instructions, when executed by the processing unit, causing the device to perform acts, including: determining a first clause with independent semantics from a target statement; converting the target statement to a first intermediate statement based on a first logical representation corresponding to the first clause; determining at least one logical representation corresponding to at least part of semantics of the first intermediate statement; and determining a target logical representation corresponding to semantics of the target statement based on the first logical representation and the at least one logical representation.

In some implementations, determining the at least one logical representation comprises: if it is determined that the first intermediate statement comprises a second clause with independent semantics, converting the first intermediate statement to a second intermediate statement based on a second logical representation corresponding to semantics of the second clause; and determining a third logical representation corresponding to at least part of semantics of the second intermediate statement; and determining the at least one logical representation based on at least the second logical representation and the third logical representation.

In some implementations, determining the first clause comprises: identifying a first clause from the target statement using a clause recognition model, wherein the clause recognition model is trained based on a plurality of training statements and position information of an independent clause with independent semantics in each training statement.

In some implementations, the position information indicates a start position and an end position of the independent clause in the training statement.

In some implementations, the acts further comprise: determining a statement logical representation corresponding to the training statement; determining a clause logical representation of a candidate clause in the training statement; and if it is determined that the statement logical representation contains the clause logical representation, determining the candidate clause as the independent clause.

In some implementations, the acts further comprise: determining a statement logical representation corresponding to the training statement; determining a clause logical representation of a candidate clause in the training statement; and if it is determined that the statement logical representation comprises the clause logical representation, converting the training statement to an intermediate training statement based on the clause logical representation; determining a first intermediate logical representation of the intermediate training statement; converting the statement logical representation to a second intermediate logical representation based on the clause logical representation; and determining the candidate clause as the independent clause based on a difference between the first intermediate logical representation and the second intermediate logical representation.

In some implementations, the first logical representation is determined using a logical representation parsing model, and the clause recognition model and the logical representation parsing model are jointly trained based on a same training dataset.

In some implementations, converting the target statement to an intermediate statement comprises: replacing a first clause in the target statement with a simplified representation of the first logical representation, so as to obtain the intermediate statement.

In some implementations, determining a target logical representation of the target statement comprises: combining the first logical representation and the at least one logical representation so as to determine the target logical representation.

In a third aspect, a computer program product is provided. The computer program product is tangibly stored in a non-transitory computer storage medium and comprises machine-executable instructions which, when executed by a device, cause the device to perform acts, including: determining a first clause with independent semantics from a target statement; converting the target statement to a first intermediate statement based on a first logical representation corresponding to the first clause; determining at least one logical representation corresponding to at least part of semantics of the first intermediate statement; and determining a target logical representation corresponding to semantics of the target statement based on the first logical representation and the at least one logical representation.

In some implementations, determining the at least one logical representation comprises: if it is determined that the first intermediate statement comprises a second clause with independent semantics, converting the first intermediate statement to a second intermediate statement based on a second logical representation corresponding to semantics of the second clause; and determining a third logical representation corresponding to at least part of semantics of the second intermediate statement; and determining the at least one logical representation based on at least the second logical representation and the third logical representation.

In some implementations, determining the first clause comprises: identifying a first clause from the target statement using a clause recognition model to, wherein the clause recognition model is trained based on a plurality of training statements and position information of an independent clause with independent semantics in each training statement.

In some implementations, the position information indicates a start position and an end position of the independent clause in the training statement.

In some implementations, the acts further comprise: determining a statement logical representation corresponding to the training statement; determining a clause logical representation of a candidate clause in the training statement; and if it is determined that the statement logical representation contains the clause logical representation, determining the candidate clause as the independent clause.

In some implementations, the acts further comprise: determining a statement logical representation corresponding to the training statement; determining a clause logical representation of a candidate clause in the training statement; and if it is determined that the statement logical representation contains the clause logical representation, converting the training statement to an intermediate training statement based on the clause logical representation; determining a first intermediate logical representation of the intermediate training statement; converting the statement logical representation to a second intermediate logical representation based on the clause logical representation; and determining the candidate clause as the independent clause based on a difference between the first intermediate logical representation and the second intermediate logical representation.

In some implementations, the first logical representation is determined using a logical representation parsing model, and the clause recognition model and the logical representation parsing model are jointly trained based on a same training dataset.

In some implementations, converting the target statement to an intermediate statement comprises: replacing a first clause in the target statement with a simplified representation of the first logical representation, so as to obtain the intermediate statement.

In some implementations, determining a target logical representation of the target statement comprises: combining the first logical representation and the at least one logical representation so as to determine the target logical representation.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of this subject matter described herein, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the particular order shown or in a sequential order, or all operations shown are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   determining, by a clause recognition model trained using a plurality of training statements and position information of independent clauses, a first clause with independent semantics from a target statement, wherein the position information indicates start and end positions of independent clauses in the plurality of training statements;
   converting, using a logical representation parsing model jointly trained with the clause recognition model based on a same training dataset, the target statement to a first intermediate statement based on a first logical representation corresponding to the first clause;
   determining at least one logical representation corresponding to at least part of semantics of the first intermediate statement by;
      converting the first intermediate statement to a second intermediate statement based on a second logical representation corresponding to semantics of a second clause when the first intermediate statement comprises the second clause with independent semantics, and
      determining a third logical representation corresponding to at least part of semantics of the second intermediate statement;
   determining a target logical representation corresponding to semantics of the target statement by combining the first logical representation and the at least one logical representation; and
   outputting the target logical representation.

2. The method of claim 1, wherein determining the at least one logical representation comprises:
   if it is determined that the first intermediate statement comprises a second clause with independent semantics,
   converting the first intermediate statement to a second intermediate statement based on a second logical representation corresponding to semantics of the second clause; and
   determining a third logical representation corresponding to at least part of semantics of the second intermediate statement; and
   determining the at least one logical representation based on at least the second logical representation and the third logical representation.

3. The method of claim 1, wherein determining the first clause comprises:
   identifying a first clause from the target statement using a clause recognition model, wherein the clause recognition model is trained based on a plurality of training statements and position information of an independent clause with independent semantics in each training statement.

4. The method of claim 3, wherein the position information indicates a start position and an end position of the independent clause in the training statement.

5. The method of claim 3, further comprising:
determining a statement logical representation corresponding to the training statement;
determining a clause logical representation of a candidate clause in the training statement; and
if it is determined that the statement logical representation contains the clause logical representation, determining the candidate clause as the independent clause.

6. The method of claim 3, further comprising:
determining a statement logical representation corresponding to the training statement;
determining a clause logical representation of a candidate clause in the training statement; and
if it is determined that the statement logical representation contains the clause logical representation,
converting the training statement to an intermediate training statement based on the clause logical representation;
determining a first intermediate logical representation of the intermediate training statement;
converting the statement logical representation to a second intermediate logical representation based on the clause logical representation; and
determining the candidate clause as the independent clause based on a difference between the first intermediate logical representation and the second intermediate logical representation.

7. The method of claim 3, wherein the first logical representation is determined using the logical representation parsing model.

8. The method of claim 1, wherein converting the target statement to a first intermediate statement comprises:
replacing a first clause in the target statement with a simplified representation of the first logical representation to obtain the first intermediate statement.

9. The method of claim 1, wherein determining a target logical representation of the target statement comprises:
combining the first logical representation and the at least one logical representation to determine the target logical representation.

10. A device, comprising:
a processing unit; and
a memory coupled to the processing unit and having instructions stored thereon which, when executed by the processing unit, cause the device to perform acts comprising:
determining, by a clause recognition model trained using a plurality of training statements and position information of independent clauses, a first clause with independent semantics from a target statement, wherein the position information indicates start and end positions of independent clauses in the plurality of training statements;
converting, using a logical representation parsing model jointly trained with the clause recognition model based on a same training dataset, the target statement to a first intermediate statement based on a first logical representation corresponding to the first clause;
determining at least one logical representation corresponding to at least part of semantics of the first intermediate statement by:
converting the first intermediate statement to a second intermediate statement based on a second logical representation corresponding to semantics of a second clause when the first intermediate statement comprises the second clause with independent semantics, and
determining a third logical representation corresponding to at least part of semantics of the second intermediate statement;
determining a target logical representation corresponding to semantics of the target statement by combining the first logical representation and the at least one logical representation; and
outputting the target logical representation.

11. The device of claim 10, wherein determining the at least one logical representation comprises:
if it is determined that the first intermediate statement comprises a second clause with independent semantics,
converting the first intermediate statement to a second intermediate statement based on a second logical representation corresponding to semantics of the second clause; and
determining a third logical representation corresponding to at least part of semantics of the second intermediate statement; and
determining the at least one logical representation based on at least the second logical representation and the third logical representation.

12. The device of claim 10, wherein determining the first clause comprises:
identifying a first clause from the target statement using a clause recognition model, wherein the clause recognition model is trained based on a plurality of training statements and position information of an independent clause with independent semantics in each training statement.

13. The device of claim 12, wherein the position information indicates a start position and an end position of the independent clause in the training statement.

14. The device of claim 12, the acts further comprising:
determining a statement logical representation corresponding to the training statement;
determining a clause logical representation of a candidate clause in the training statement; and
if it is determined that the statement logical representation contains the clause logical representation, determining the candidate clause as the independent clause.

15. At least one non-transitory computer storage medium comprising machine-executable instructions which, when executed by a device, cause the device to perform acts comprising:
determining, by a clause recognition model trained using a plurality of training statements and position information of independent clauses, a first clause with independent semantics from a target statement, wherein the position information indicates start and end positions of independent clauses in the plurality of training statements;
converting, using a logical representation parsing model jointly trained with the clause recognition model based on a same training dataset, the target statement to a first intermediate statement based on a first logical representation corresponding to the first clause;
determining at least one logical representation corresponding to at least part of semantics of the first intermediate statement by:
converting the first intermediate statement to a second intermediate statement based on a second logical representation corresponding to semantics of a second clause when the first intermediate statement comprises the second clause with independent semantics, and determining a third logical representation corresponding to at least part of semantics of the second intermediate statement;

determining a target logical representation corresponding to semantics of the target statement by combining the first logical representation and the at least one logical representation; and outputting the target logical representation.

16. The at least one non-transitory computer storage medium of claim 15, wherein determining the at least one logical representation comprises:

if it is determined that the first intermediate statement comprises a second clause with independent semantics, converting the first intermediate statement to a second intermediate statement based on a second logical representation corresponding to semantics of the second clause; and determining a third logical representation corresponding to at least part of semantics of the second intermediate statement; and determining the at least one logical representation based on at least the second logical representation and the third logical representation.

17. The at least one non-transitory computer storage medium of claim 15, wherein determining the first clause comprises:

identifying a first clause from the target statement using a clause recognition model, wherein the clause recognition model is trained based on a plurality of training statements and position information of an independent clause with independent semantics in each training statement.

18. The at least one non-transitory computer storage medium of claim 17, wherein the position information indicates a start position and an end position of the independent clause in the training statement.

19. The at least one non-transitory computer storage medium of claim 17, the acts further comprising:

determining a statement logical representation corresponding to the training statement;

determining a clause logical representation of a candidate clause in the training statement; and if it is determined that the statement logical representation contains the clause logical representation, determining the candidate clause as the independent clause.

20. The at least one non-transitory computer storage medium of claim 17, further comprising:

determining a statement logical representation corresponding to the training statement;

determining a clause logical representation of a candidate clause in the training statement; and if it is determined that the statement logical representation contains the clause logical representation, converting the training statement to an intermediate training statement based on the clause logical representation;

determining a first intermediate logical representation of the intermediate training statement;

converting the statement logical representation to a second intermediate logical representation based on the clause logical representation; and determining the candidate clause as the independent clause based on a difference between the first intermediate logical representation and the second intermediate logical representation.

\* \* \* \* \*